US006985895B2

(12) United States Patent
Witkowski et al.

(10) Patent No.: US 6,985,895 B2
(45) Date of Patent: Jan. 10, 2006

(54) PERFORMING SPREADSHEET-LIKE CALCULATIONS IN A DATABASE SYSTEM

(75) Inventors: Andrew Witkowski, Foster City, CA (US); Gregory Dorman, Melrose, MA (US); Fred Zemke, Foster City, CA (US); Martin Roth, Ashland, MA (US); Cetin Ozbutun, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 337 days.

(21) Appl. No.: 09/886,839

(22) Filed: Jun. 20, 2001

(65) Prior Publication Data

US 2002/0059203 A1 May 16, 2002

Related U.S. Application Data

(60) Provisional application No. 60/218,851, filed on Jul. 13, 2000.

(51) Int. Cl.
G06F 17/30 (2006.01)
(52) U.S. Cl. ............................. 707/3; 707/2; 707/101; 707/102; 707/104.1
(58) Field of Classification Search ............. 707/1–10, 707/100–104.1, 200–205
See application file for complete search history.

(56) References Cited

U.S. PATENT DOCUMENTS

| | | | | |
|---|---|---|---|---|
| 5,319,777 A | * | 6/1994 | Perez ........................... 707/10 |
| 5,359,724 A | * | 10/1994 | Earle ........................... 707/205 |
| 5,819,282 A | * | 10/1998 | Hooper et al. .......... 707/103 R |
| 5,943,668 A | | 8/1999 | Malloy et al. ................. 707/3 |
| 5,978,796 A | | 11/1999 | Malloy et al. ................. 703/3 |
| 6,317,750 B1 | * | 11/2001 | Tortolani et al. ....... 707/103 R |
| 6,434,544 B1 | * | 8/2002 | Bakalash et al. .............. 707/2 |
| 6,615,241 B1 | * | 9/2003 | Miller et al. ................ 707/100 |
| 2004/0133567 A1 | | 7/2004 | Witkowski et al. |
| 2004/0133568 A1 | | 7/2004 | Witkowski et al. |

FOREIGN PATENT DOCUMENTS

| | | | |
|---|---|---|---|
| JP | 411161656 A | * | 9/1999 |
| WO | WO 99/48029 A1 | | 9/1999 |

OTHER PUBLICATIONS

Jim Gray et al., "Data Cube: A Relational Aggregation Operator Generalizing Group-By, Cross-Tab, and Sub-Totals," Feb. 26, 1996, IEEE, XP010158909, pp. 152-159.

Mark Rittman, "The New Oracle 10g SQL MODEL Clause, "Breaking Oracle News, http://dba-oracle.com/oracle_news/2004_1_15_ rittman.htm, data retrieved Apr. 8, 2004, pp. 1-4.

(Continued)

Primary Examiner—Mohammad Ali
Assistant Examiner—Isaac M. Woo
(74) Attorney, Agent, or Firm—Marcel K. Bingham; Hickman Palermo Truong & Becker LLP

(57) ABSTRACT

A method and system for performing spreadsheet-like operations in a database system is described herein. As explained, a database language is extended to introduce new clauses ("spreadsheet-like clauses"), for defining and executing spreadsheet-like operations on data contained within a RDBMS. According to one aspect of the invention, in response to receiving a database query that specifies an operation for manipulating data, data from a relational structure is retrieved and stored in a non-relational structure that can be addressed as a multi-dimensional array. The operation specified in the database query is the performed on then data.

36 Claims, 5 Drawing Sheets

TABLE 200
(AFTER SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |
| 202→ | | | | |
| 204→ | | | | |
| east | wine | 1998 | 15,000 | 1,500 |
| east | beer | 1998 | 20,000 | 2,000 |
| east | coke | 1998 | 40,000 | 4,000 |
| east | wine | 1999 | 20,000 | 2,000 |
| east | beer | 1999 | 25,000 | 2,500 |
| east | coke | 1999 | 45,000 | 4,500 |
| 206→ | | | | |
| 208→ | | | | |

OTHER PUBLICATIONS

European Patent Office, "Communication pursuant to Article 96(2) EPC," Aug. 22, 2004, 4 pages.

"New Claims, (Clean Copy)," Current claims from International Application No. 01984272.3, pp. 48-50.

Copy of Invitation pursuant to Article 96(2) and Rule 51(2) EPC from corresponding European case 01984272.3.

Copy of current claims of corresponding European case 01984272.3.

* cited by examiner

Fig. 1

TABLE 100

(BEFORE SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |
| east | wine | 1998 | 15,000 | 1,500 |
| east | beer | 1998 | 20,000 | 2,000 |
| east | coke | 1998 | 40,000 | 4,000 |
| east | wine | 1999 | 20,000 | 2,000 |
| east | beer | 1999 | 25,000 | 2,500 |
| east | coke | 1999 | 45,000 | 4,500 |

Fig. 2

TABLE 200

(AFTER SPREADSHEET CLAUSE)

|   | r | p | t | s | c |
|---|---|---|---|---|---|
|   | west | wine | 1998 | 10,000 | 1,000 |
|   | west | beer | 1998 | 15,000 | 1,500 |
|   | west | coke | 1998 | 30,000 | 3,000 |
|   | west | wine | 1999 | 20,000 | 2,000 |
|   | west | beer | 1999 | 30,000 | 3,000 |
|   | west | coke | 1999 | 60,000 | 6,000 |
| 202 → | west | wine | 2000 | 20,000 | - |
| 204 → | west | beer | 2000 | 22,500 | - |
|   | east | wine | 1998 | 15,000 | 1,500 |
|   | east | beer | 1998 | 20,000 | 2,000 |
|   | east | coke | 1998 | 40,000 | 4,000 |
|   | east | wine | 1999 | 20,000 | 2,000 |
|   | east | beer | 1999 | 25,000 | 2,500 |
|   | east | coke | 1999 | 45,000 | 4,500 |
| 206 → | east | wine | 2000 | 25,000 | - |
| 208 → | east | beer | 2000 | 27,500 | - |

Fig. 3

TABLE 300
(BEFORE SPREADSHEET CLAUSE)

| r | p | t | s | c |
|---|---|---|---|---|
| west | wine | 1998 | 10,000 | 1,000 |
| west | beer | 1998 | 15,000 | 1,500 |
| west | coke | 1998 | 30,000 | 3,000 |
| west | wine | 1999 | 20,000 | 2,000 |
| west | beer | 1999 | 30,000 | 3,000 |
| west | coke | 1999 | 60,000 | 6,000 |

Fig. 4

TABLE 400

(AFTER SPREADSHEET CLAUSE)

| | r | p | t | s | c |
|---|---|---|---|---|---|
| | west | wine | 1998 | 10,000 | 1,000 |
| | west | beer | 1998 | 15,000 | 1,500 |
| | west | coke | 1998 | 30,000 | 3,000 |
| | west | wine | 1999 | 20,000 | 2,000 |
| | west | beer | 1999 | 30,000 | 3,000 |
| | west | coke | 1999 | 60,000 | 6,000 |
| 402 → | west | beer | 2000 | 45,000 | - |
| 404 → | west | beer | 2001 | 75,000 | - |
| 406 → | west | beer | 2002 | 120,000 | - |
| 408 → | west | beer | 2003 | 195,000 | - |
| 410 → | west | beer | 2004 | 315,000 | - |
| 412 → | west | beer | 2005 | 510,000 | - |

PERFORMING SPREADSHEET-LIKE CALCULATIONS IN A DATABASE SYSTEM

CLAIM OF PRIORITY

This patent application claims priority from U.S. Provisional Patent Application No. 60/218,851, filed on Jul. 13, 2000, entitled SQL SPREADSHEET FUNCTIONS, the content of which is hereby incorporated by reference in its entirety.

COPYRIGHT AUTHORIZATION

A portion of the disclosure of this patent document contains material which is subject to copyright protection. The copyright owner has no objection to the facsimile reproduction by any one of the patent disclosures, as it appears in the U.S. Patent & Trademark Office patent files or records, but otherwise reserves all copyright rights whatsoever.

FIELD OF THE INVENTION

The present invention relates generally to the processing of database queries, and more specifically, to performing spreadsheet-like operations in a data system.

BACKGROUND OF THE INVENTION

One of the most successful business analytical tools is a spreadsheet. In general, a spreadsheet program (also hereafter referred to as a "spreadsheet") allows a person to specify business data and to formulate operations on the data, to construct simultaneous equations with recursive models, and to perform abstract computations on the data using a macro language. In addition, many spreadsheet programs come with a user interface for managing formulas and presenting results in graphical, tabular along with a variety of other types of formats.

For example, a typical spreadsheet program configures the memory of a computer to resemble the column/row or grid format of an accountant's columnar pad, thus providing a visible calculator for a user. To access information in a spreadsheet, specific locations within the spreadsheet must be communicated to the computer in a format which it can understand. A common scheme for accomplishing this is to assign a number to each row in a spreadsheet, and a letter to each column. To reference a location at column A and row 1 (i.e., the upper-left-hand corner), for example, the user types in "A1". In this manner, the spreadsheet defines an addressable storage location or "cell" at each intersection of a row with a column.

Unfortunately, the analytical usefulness of database query languages, such as the Structure Query Language (SQL), has not yet measured up to that of spreadsheets. For example, it is generally very cumbersome and in most cases very inefficient to perform inter-row calculations in SQL. In general, this limitation stems from a fundamental problem that results from the lack of a cell concept and cell addressing within SQL and more specifically from the lack of a formula for manipulating data within a cell. Thus, in a typical scenario, data is first extracted from a Relational Database Management System (RDBMS) into a tool like a spreadsheet (or a specialized multi-dimensional analysis tool). Thereafter, the extracted data may be manipulated by executing a set of spreadsheet operations on the data within the spreadsheet.

However, the manipulation of data using these spreadsheet operations can itself introduce certain problems. For example, a typical set of spreadsheet operations provides for two dimensional "row-column" cell addressing, which makes symbolic structured model building difficult. For example, change management is made difficult since adding a computation parameter requires manual spreadsheet changes. In addition, a significant scalability problem exists when the number of formulas becomes large (greater than a few thousand), as spreadsheets do not provide parallel execution. Still further, in a collaborative enterprise setting that contains numerous spreadsheets, consolidation can be extremely difficult. However, if the information on the spreadsheets is not consolidated, it may be nearly impossible to get a picture of a business by querying multiple spreadsheets.

Based on the foregoing, there is a clear need for a mechanism that addresses the problems that are generally associated with the manipulation of data in spreadsheet programs and the issues that typically arise from attempting to perform spreadsheet-like operations on data contained within a RDBMS.

SUMMARY OF THE INVENTION

A method and system for performing spreadsheet-like operations in a database system is described herein. As explained, a database language is extended to introduce new clauses ("spreadsheet-like clauses"), for defining and executing spreadsheet-like operations on data contained within a RDBMS. According to one aspect of the invention, in response to receiving a database query that specifies an operation for manipulating data, data from a relational structure is retrieved and stored in a non-relational structure that can be addressed as a multi-dimensional array. The operation specified in the database query is then performed on the data.

According to another aspect of the invention, in response to receiving a query that includes a spreadsheet-like operation, data is retrieved and stored in a multidimensional array. The operation specified in the spreadsheet-like clause is then performed on the data that was stored in the multidimensional array.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 depicts a Table 100 as it existed prior to the application of a spreadsheet clause;

FIG. 2 depicts a Table 200 that illustrates the additional new row information after the application of a spreadsheet clause;

FIG. 3 depicts a Table 300 as it existed prior to the application of a spreadsheet clause;

FIG. 4 depicts a Table 400 that illustrates the additional new row information after the application of a spreadsheet clause.

DETAILED DESCRIPTION OF THE PREFERRED EMBODIMENT

Figure 5:
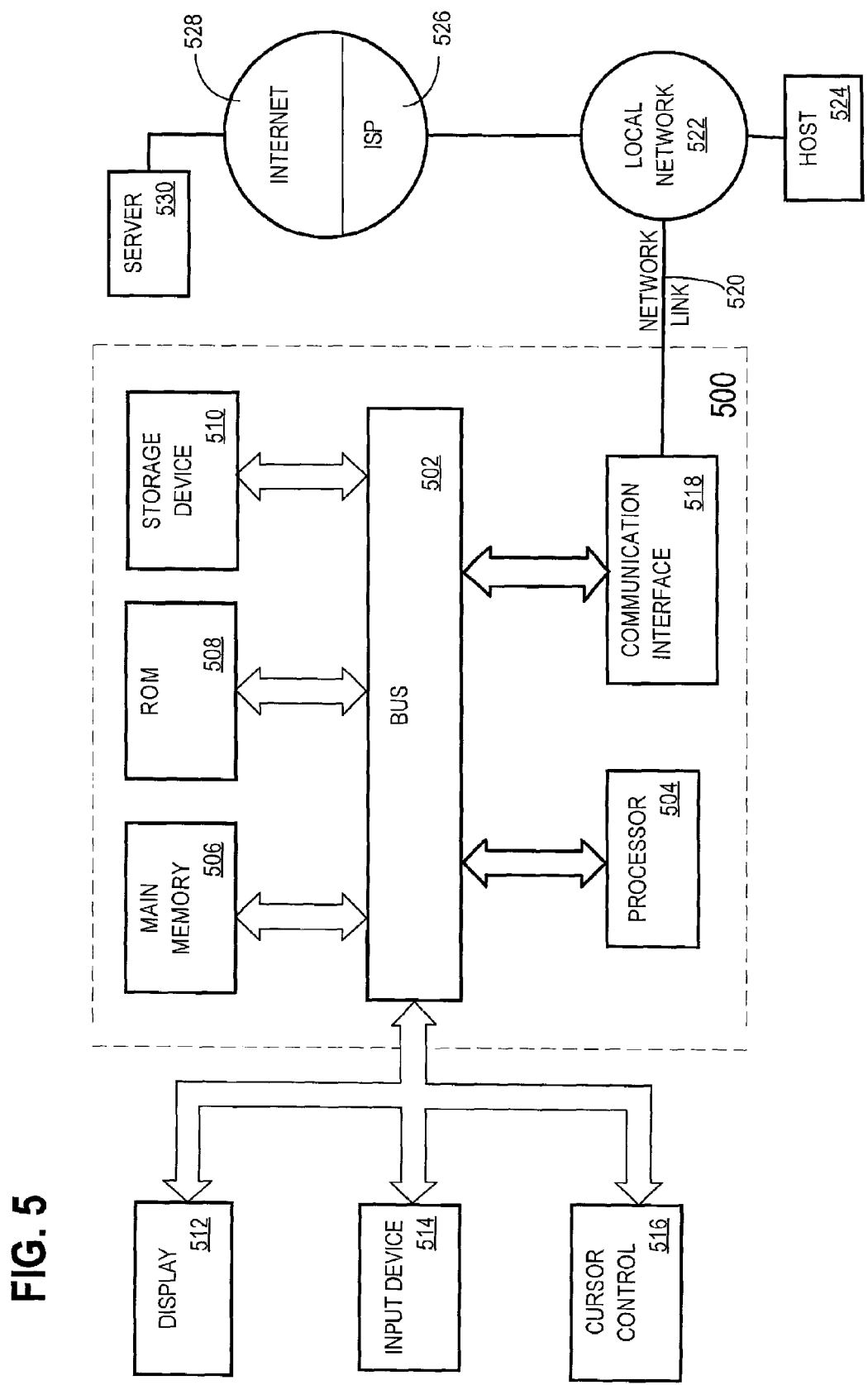
FIG. 5 is a block diagram of a computer system with which an embodiment may be carried out.

A mechanism for performing spreadsheet-like operations in a database system is provided. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context Overview

A mechanism for performing spreadsheet-like operations in a database system is described herein. In one embodiment, a database language is extended to introduce new clauses ("spreadsheet-like clauses"), for defining and executing spreadsheet-like operations on data contained within a RDBMS. The extensions can provide an improvement over spreadsheet programs by integrating their analytical functions into an RDBMS, improving readability with symbolic referencing, and providing greater scalability and improved manageability (security, space and other controls under one umbrella). Additionally, the extensions provide a clear improvement over conventional database languages by providing spreadsheet-like computations directly within the language.

For explanation purposes, techniques for providing spreadsheet-like computations within a database system are described in reference to extending the Structured Query Language (SQL). However, the described methods and systems may be applied to other database and/or query languages. Thus, the provided examples are not to be construed as limiting embodiments of the inventions to any particular database and/or query language.

For example, in certain embodiments, a query language, such as SQL, is extended to include new SQL clauses to partition a table (or a result of a query) and to perform array-like computations within a partition for providing the following new features:

(1) Symbolic cell addressing. The SQL language is extended to allow columns in individual rows to be treated like cells which can be referenced (and updated) symbolically. For example, in a fact table (region, year, sales), a user can directly reference sales for a given region and year, (e.g., sales[region='west', year=1998]). As depicted, the cells may be referenced symbolically, thus improving on the typical spreadsheet application.

(2) Symbolic array computation. The SQL language is extended to allow a user to specify a series of assignments in a manner that is similar to the spreadsheet formulas. In one embodiment, the SQL extensions allow users to perform operations on individual cells and/or on ranges of cells. In certain embodiments, the SQL extensions support new clauses for aggregating data over a range of cells. For example, the SQL extensions provide for the following the new SQL clauses:

$s[r=\text{'west'}, y=2000]=s[r=\text{'west'}, y=1999]+s[r=\text{'west'}, y=1998]$, $s[r=\text{'east'}, y=2000]=\max(s)[r=\text{'west'}, y \text{ between } 1997 \text{ and } 1999]$ (3) Shorthands. Shorthands are provided for expressiveness. For example, a shorthand may be provided that allows positional referencing, for example, s['west', 2000] instead of s[r='west', y=2000]. Additionally, a shorthand may be provided that allows for updating multiple cells on the left side using a single assignment rule (akin to spreadsheet macros). For example, the SQL language may be extended to provide for the shorthand s[r=*,y=2000]=s[current(r), 1999] which can be used to assign to all regions (r) in year 2000, sales values (s) as of the year 1999. In this example, the relative addressing is effected by the function current(r) which passes the region values from the left to the right side.

(4) Automatic expression ordering. In certain embodiments, similarly to spreadsheets, expressions in the spreadsheet clause are automatically ordered based on dependencies between cells. For example, given the expressions $s[r=\text{'west'}, y=2000]=s[r=\text{'west'}, y=1999]+s[r=\text{'west'}, y=1998]$, $s[r=\text{'west'}, y=1999]=50000$, $s[r=\text{'west'}, y=1998]=40000$ the last two assignments are processed first.

(5) Scalability of computation. In certain embodiments, the SQL language is extended to allow a user to partition the data and to perform a set of array computations in parallel within a partition. For example, for the expression $$\text{partition by r dimension by t} \\ ( \\ \quad s[t=2000] = \text{avg}(s)[t \text{ between } 1990 \text{ and } 1999] \\ )$$

the data is partitioned by a region r and within each partition (which may be processed in parallel) a prediction of the sales in the year 2000 is calculated based on the number of average sales in the years between 1990 and 1999. This partitioning function provides an increase in scalability that does not typically exist in spreadsheet applications.

(6) Recursive model solving. Similarly to spreadsheets, the SQL language is extended to provide for solving recursive references. For example in:

$$\text{dimension by x iterate (4)} \\ ( \\ \quad s[x=1] = s[x=1]/2 \\ )$$

execution of the operation repeats the recursive $s[x=1]:=s[x=1]/2$ assignment four (4) times. In certain embodiments, the termination of recursion can be based on the number of specified cycles and/or a particular convergence criteria. This type of operation may be useful in a variety of different business applications.

(7) Stored models. In certain embodiments, a new spreadsheet clause can either appear in a query directly or it can be named, stored and applied to a query later. This gives a user the ability to store business models directly in RDBMS. Thus, causing data and models to reside under a single RDBMS management (including security), potentially making the integration of business models easier. In one embodiment, two mechanisms are provided for storing models: the parameterized view and the spreadsheet template. These models can be useful outside of the Online Analytical Processing (OLAP) context as they provide a way of separating computation from the data that conventional SQL does not support. For example, a parameterized view will allow a user to pass a table or a query block to a view as a parameter. In this case, the view will specify a "computation done" on the parameter so that during view invocation "real" data can be passed by providing a table name or a query.

(8) Materialized views. In certain embodiments, queries with a spreadsheet clause can be stored in a materialized view. Thus, causing a change to the data to result in an automatic maintenance of the model.

Spreadsheet Addressing in SQL

Provided below are examples of how SQL can be extended to include spreadsheet-like operations. For explanation purposes, several of the examples use a fact table with time, product, and region dimensions and one measure sales: fact(t, p, r, s). It should be noted that, although specific examples have been provided for explanation purposes, embodiments of the invention are not limited to any particular example.

Spreadsheet Clause

In multidimensional applications, a fact table generally consists of columns that uniquely identify a row, along with other information that serves as dependent measures or attributes. In one embodiment, a new SQL clause is provided ("spreadsheet clause"), which divides the identifying columns into "partitioning" and "dimension" columns. The dimension columns uniquely identify a row within a partition and serve as array indexes to measures within it. In certain embodiments, the spreadsheet clause includes a list of updates that represent array computation within a partition and which is a part of an SQL query block. For example, the spreadsheet clause structure may be as follows:

```
<existing parts of a query block>
PARTITION BY <cols> DIMENSION BY <cols>
                [ORDERED] [UPSERT | UPDATE | UPDATEIF]
                IGNORE NAV]
                ITERATE (n) [UNTIL <condition>]]
(
    <update rule>, <update rule>,..., <update rule>
)
```

In this example, each <update rule> ("rule") represents an assignment and contains (1) a left side which references a cell (or a range of cells) and (2) right side which contains expressions involving constants, host variables, individual cells or ranges of cells within the partition.

For example, the query

```
Q1  select r, p, t, sum(m) as s, count(m) as c
        from fact
        group by r, p, t
        partition by r dimension by p, t upsert
        (
            s[p='wine', t=2000] = s[p='wine', t=1999],
            s[p='beer', t=2000] = s[p='beer', t=1998] + s[p='beer', t=1999]
        )
``` takes the result of the SELECT . . . GROUP BY . . operation, and then partitions it by region r and predicts that within each region sales of wine in 2000 will be the same as in 1999 and sales of beer in 2000 will be the sum sales in 1998 and 1999.

In one embodiment, the spreadsheet clause operates on the result of the SELECT . . . GROUP BY . . query without updating any base table.

Optional ORDERED|UPSERT, etc. sub-clauses are described in detail below.

Cell References

A reference to a cell should qualify all dimensions in the partition and can use either symbolic or positional referencing. Using a symbolic reference, a single dimension is qualified using a boolean condition, as for example:

$$s[p=\text{'wine'}, t=2000]$$

or $$s[p \text{ is null}, t=2000]$$

In general, there as many conditions inside the "[ ]" brackets as there are dimensions in the DIMENSION BY clause. A single condition can qualify only one dimension and can be any single column predicate. For example, d=<value>, d is null, d {>,>=,<,<=,< >} <value>, d in <list of values>, d between <value> and <value>, d like <value>. In certain embodiments, a restriction is placed on the conditions such that sub-queries are not allowed. For example, d=<value> selects a single cell. Alternatively, other conditions may be used for selecting multiple cells.

In certain embodiments, for a positional reference, a dimension is implied by its position in the DIMENSION BY clause and is qualified by an expression. For example, for the spreadsheet clause DIMENSION BY (p, t), the reference $$s[\text{'wine'}, 2000]$$

$$s[\text{null}, 2000]$$

is equivalent to s[p='wine', t=2000] and s[p is null, t=2000]. In addition, positional and symbolic referencing can be mixed, for example, s['wine', t=2000] is legal. However, in certain embodiments, to ensure consistency in both symbolic and positional referencing, a dimension d must appear in its position as indicated by the DIMENSION BY clause. Thus, for DIMENSION BY (p, t), the clause s['wine', t=2000] is legal while the clause s[t=2000, 'wine'] is generally not legal.

In certain embodiments of the inventions, the conditions qualifying the dimensions of an operation can use constants and host variables as well. Frequently, dimensions on the right side are determined by dimensions on the left side, as in for example:

$$s[p=\text{'beer'}, t=2000]=s[p=\text{'beer'}, t=1998]+s[p=\text{'beer'}, t=1999]$$

A short hand notation is provided which will cause dimensions on the right side to default to the dimensions that are provided on the left side, thus potentially making the assignments less error prone. In one embodiment, the "." notation is used as the shorthand notation. For example, for the above clause, using the "." shorthand notation, the clause may be expressed as:

$$s[p=\text{'beer'}, t=2000]=s[., t=1998]+s[., t=1999]$$

In addition, as in other SQL expressions, functions can be applied to expressions on the right hand side of an assignment. For example, in the expression:

$$s[p=\text{'beer'}, t=2000]=\text{ceil}(s[p=\text{'beer'}, t=1998])$$

the functions is applied to the expression on the right hand side of the assignment.

Range References on the Right Hand Side

In certain embodiments, the SQL language is extended to allow a reference to a set of cells on the right hand side of a rule. In one embodiment, an aggregate operation, such as sum or count, must be applied to that set. To reference a set along a dimension d, a boolean condition is used on one dimension of column d, for example d BETWEEN ... or d IN ... or d LIKE ... d $\{>,>=,<,<=,< >\}$ ... etc. For example:

$s[p=$'wine', $t=2000]=\text{avg}(s)[p=$'wine', $t$ between 1990 and 1999$]$

In general, range references on the right hand side never generate new rows, but instead loop over the existing rows. For example, if in the above rule there are rows with even values of t=1990, 1992, ... , 1998, but no rows with odd values of t=1991, 1993, ... , 1999, only the existing even values of t will contribute to the aggregate. In certain embodiments, the aggregate operation can be applied to more than one measure. For example, assume that in addition to sales, s, for each row a weight w is also stored that indicates how much a given year should contribute to a prediction. Then, for the expression:

$s[p=$'wine', $t=2000]=\text{avg}(s*w)[p=$'wine', $t$ between 1990 and 1999$]$ a sum of the weighted sales in the years between 1990 and 1999 is calculated. In addition, in certain embodiments, an open ended range may be provided using a relational operator $\{$e.g., $>,>=,<,<=,< >\}$. For example, as in the expressions:

$\text{sum}(s)[p=$'wine', $t<1999]$ sums all years in the partition less than 1999.

In one embodiment, a special notation, for example "*", is provided for an open range on both sides of the expression. For example, the expression $\text{sum}(s)[p=$'wine', *$]$ sums all years in the partition where product is wine.

In a further embodiment, another way to specify a range of cells is to enumerate a list of cell references enclosed in parenthesis. For example, as in the expressions:

$[(p=$'wine', $t=1998), (p=$'wine', $t=1999), \ldots ]$ or possibly more simply:

$[($'wine', 1998$), ($'wine', 1999$), \ldots ]$.

These expressions are equivalent to the set produced by the predicate: (p='wine', t=1998) OR (p='wine', t=1999) OR ....

Still further, a rule can be expressed as:

$\text{avg}(s)[(p=$'vodka', $t=1990), (p=$'wine', $t=1998), (p=$'beer', $t=1999)]$ In one embodiment, when a range of cells is referenced on the right side, existing aggregates (sum, avg, count) are allowed which don't explicitly specify an ordering. In certain embodiments, aggregate functions cannot contain the DISTINCT option. For window functions and inverse distribution functions an ordering of cells is required to properly perform the operations.

In one embodiment, the rules for evaluating an expression on the right hand side are the same as for the non-extended version of the SQL. For example, if a cell evaluates to null or is missing, the result of an expression is null unless it is included in an aggregate where nulls are ignored. To illustrate this point, if a record for the year 1998 is not recorded, then the expression:

$s[p=$'beer', $t=2000]=s[p=$'beer', $t=1998]+s[p=$'beer', $t=1999]$ returns value of null. Alternatively, for the following expression, which includes an aggregate, a non-null value is returned since at least one cell in the set evaluates to a non-null value:

$s[p=$'beer', $t=2000]=\text{avg}(s)[p=$'beer', $t$ between 1998 and 1999$]$

In certain embodiments, the spreadsheet clause includes the UPSERT semantic by default. In one embodiment, if the row representing the left hand side of an assignment is present in the table, the indicated cell is updated; otherwise, a new row is created. For example, if for the following query, Q2   select p, r, t, sum(m) as s, count(m) as c
     from fact
     group by p, r, t
     partition by r dimension by p, t  UPSERT
     (
         s['wine', 2000] = s['wine', 1999],
         s['beer', 2000] = avg(s)['beer', t between 1990 and 1999]
     )

no rows with the year 2000 exist, two new t=2000 rows per every region (one row for 'wine' one for 'beer') are created in the output. In addition, for the new rows, columns that have not been assigned values are set to null. For example, if the SELECT . . GROUP BY . . part of the above query is as depicted in Table 100 of FIG. 1, then, after applying the spreadsheet clause, the information contained in Table 100 will be updated, to include new rows 202, 204, 206 and 208, as reflected in Table 200 of FIG. 2.

Looping Constructs on the Left Hand Side

The previous examples have been depicted with the left hand side of an assignment as having a single cell. However, in certain embodiments, an assignment may be performed where the left hand side is a range of cells. In one embodiment, for each left hand side that consists of a range of cells, the right hand side is re-evaluated. However, to perform this function, it is generally necessary to be able to perform relative indexing with respect to the left side. In certain embodiments, a special function, current( ), is introduced which returns the current value of a dimension from the left side. This special function can then be used on the right side of an assignment. For example, consider the following expression:

$s[p=$'beer', $t=2000]=s[\text{current}(p), t=1998]+s[\text{current}(p), t=1999]$ In this example, the right hand side includes a reference to current(p) which assumes a current value of product p on the left hand side (i.e., 'beer'). Thus, the expression above is equivalent to:

$s[p=$'beer', $t=2000]=s[p=$'beer', $t=1998]+s[p=$'beer', $t=1999]$ and which is equivalent to:

$s[p=$'beer', $t=2000]=s[\text{current}(p), t=\text{current}(t)-2]+s[\text{current}(p), t=\text{current}(t)-1]$ Additionally, in certain embodiments, a shorthand notation for the current( ) function may be denoted by ".", as illustrated in the following example:

$s[p=$'beer', $t=2000]=s[., t=1998]+s[., t=1999]$

It is noted that relative indexing may be complemented with looping constructs on the left side. To address this issue, in certain embodiments, two constructs, existential and qualified loops, are provided. For example, an existential looping construct on the left side specifies a range of existing cells using single column predicates like 't between 1990 and 1999' or 't like "199%"'. These constructs are used to qualify existing rows. Thus, a range on the left can be designated and relative indexing may be used on the right. For example, consider the following assignment:

$s[p=$'beer', $t$ between 2000 and 2005$]= s[$'beer', $t=$current$(t)-2]+s[$'beer', $t=$current$(t)-1]$ For explanation purposes, assume that the data contains values for odd years only, (i.e., t=2001, 2003, and 2005). Then, the right side represents, for each existing year, the sum of two previous years. For example, for year 2001 it will be the sum of year 1999 and 2000.

In addition, in certain embodiments, for numerical, date and string ranges, qualified loops are provided which designate the cells using increments. For example, the SQL can be extended so that existing BETWEEN <v1> AND <v2> clauses are extended to BETWEEN <v1> AND <v2> INCREMENT <n> clauses to allow discrete increments within a range. Additionally, existing LIKE clauses can be extended to LIKE <string with single %> INCREMENT <n>. For example, consider the assignment:

$s[p=$'beer', $t$ between 2000 and 2005 increment 1$]=$
        $s[$'beer', $t=$current$(t)-2]+s[$'beer', $t=$current$(t)-1]$ In this example, the left side designates a range of years between 2000 and 2005 with an increment 1 (i.e., years 2000, 2001, 2002, 2003, 2004, and 2005). Thus, by default, if the data contains values for odd years, for example, t=2001, 2003, and 2005, the odd years will be updated and additional rows will be created for the missing years t= 2000, 2002, and 2004.

In the above example, the right side represents, for each year, the sum the two previous years. For example for year 2002, it will be the sum of year 2000 and 2001. However, the above assignment can also be expressed also using an aggregate such as:

$s[p=$'beer', $t$ between 2000 and 2005 increment 1$]=$
        sum($s$) [$'$beer', $t$ between current$(t)-2$ and current $(t)-1]$ Thus, given this query:

```
Q3  select p, r, t, sum(m) as s, count(m) as c
    from fact
    group by p, r, t
    partition by r dimension by p, t upsert
    (
        s['beer', t between 2000 and 2005 increment 1] =
            sum(s)['beer', t between current(t)-2 and current(t)-1]
    )
``` and the initial data of SELECT . . GROUP BY . . . as presented in Table 300 of FIG. 3, execution of the query will generate new rows 402, 404, 406, 408, 410 and 412, as reflected in Table 400 of FIG. 4.

With regards to this example, the d BETWEEN <v1> AND <v2> INCREMENT <n> is semantically equivalent to (FOR d=<v1> TO <v2> d+<n>). Thus, in this example, d BETWEEN 2005 AND 2000 INCREMENT =1 designates rows d=2005, 2004, . . . 2000 in that order and d BETWEEN 2005 AND 2000 INCREMENT 1 designates an empty range.

Additionally, the INCREMENT operator applies to all data types for which addition & subtraction is supported, i.e., numeric and date types. For the latter, increments of the interval type may be used.

Still further, the LIKE <string with single %> INCREMENT <n> assumes that <string with single %> contains only one '%' character. It replaces '%' with character correspondent of <n> during execution. For example, consider this assignment:

$s[p=$'beer', $y=$2000, quarter like 'Q%' between 1 and 4 increment 1$] =s[$'beer', $y=$1999, current(quarter)$]$ Here, the left side designates rows where y=2000 and quarter is 'Q1', 'Q2', 'Q3' 'Q4' while the right side designates rows where year=1999 and quarters as designated on the left side.

In certain embodiments, the current( ) function can be specified only for the same dimension. Thus, the expression $s[p=$'beer', $t$ between 2000 and 2005 increment 1$]=$
        avg($s[$'beer', $t$ between current$(t)-1$ and current $(t)-2])$ is legal (i.e., for each year between 2000 and 2005, an average is calculated for the sales of the two previous years). However, the expression $s[p=$'beer', $t$ between 2000 and 2005 increment 1$]=$
        avg($s$)$[$'beer', $t$ between current$(p)-1$ and current $(p)-2]$ is not legal as it mixes dimension t and p.

In certain embodiments, other conditions that designate ranges of cells can be used on the left hand side. For example, to double beer sales for all recorded years>1999 the following expression can be used:

$s[p=$'beer', $t>$1990$]2*s[p=$'beer', current$(t)]$

In this example, a slight difference is observed between 't between 2000 and 2005' and 't between 2000 and 2005 increment 1'. In particular, the former will operate only on the existing data, i.e., for rows with t=2000, 2004, 2005, it will loop through those three years only. However, in the later, a loop through all years between 2000 and 2005 will be performed.

In certain embodiments, the looping on the left hand side can be specified for more than one dimension. For example, for the expression:

$s[p$ in ('beer', 'wine'), $t$ between 2000 and 2005 increment 1$]=$ avg($s$)[current$(p)$, $t$ between current$(t)-1$ and current$(t)-2]$ all combinations will be tried and the order of evaluation will be determined by a nested loop starting from the left-most dimension. For example, for the above case, in evaluating the expression, the system first fixes p='beer' and iterate through the 2000, . . . , 2005 years, and then fixes p='wine' and then iterate through these years again.

In general, the qualified looping constructs BETWEEN <v1> AND <v2> INCREMENT <n> can only appear in the spreadsheet clause. The <n> parameter can assume negative values resulting in descending loops. In addition, the qualified looping constructs can be referenced on the right side of a rule. In such a case, the parameters imply a range of cells and thus an aggregate operator must be applied to them. For example, the expression:

$s[p=$'beer', $t=$2000$]=$avg($s$)$[$'beer', $t$ between 1990 and 1998 increment 2$]$ predicts sales of beer in 2000 to be the average of sales in even years between 1990 and 1998.

Treatment of Nulls and Missing Values

In certain popular spreadsheets, an un-initialized cell in a numeric expression is treated as a zero ("0"), which provides a convenient programming simplification (i.e., there is no need to test for un-initialized cell, etc). Here, certain embodiments of the invention are required to address two types of undetermined values. One is a NULL value in the existing cells and the other is a non-determined value from a missing cell.

In one embodiment, NULLs are treated the same as with everywhere else in SQL. Missing values are treated as NULLs in direct cell references and as non-existing values in aggregates (similarly to SQL treatment of NULLs).

For example, if in the expression, $s$['beer', 2000]=$s$['beer', 1998]+$s$['beer', 1999]

the row ['beer', 1999] is missing, then the resulting expression is NULL. However, for the expression, $s$['beer', 2000]=sum($s$)['beer', $t$ between 1998 and 1999]

the missing row is ignored.

In certain cases it may be desirable to distinguish between an existing NULL value and a missing value. For such cases, a predicate may be introduced to resolve the issue. For example, the IS PRESENT(<cell>) predicate may be set to TRUE if the row indicated by the <cell> reference existed BEFORE the execution of the spreadsheet clause. Here, it is noted that the IS PRESENT clause relates to the state before the execution of the spreadsheet clause.

For example, in executing the query:

```
select p, r, t, sum(m) as s, count(m) as c
from fact
group by p, r, t
partition by r dimension by p, t
(
    s['wine',2000] =
        case when is present s['wine', 1999]
            then ['wine', 1999]
            else 0
        end
)
``` the query first checks whether or not the row with [p='wine', t=1999] exists, and if so, uses the information within the row.

A variation on the "is present" predicate is the "presentv" function. It accepts a cell and two expressions e1 and e2, for example "presentv(cell, e1, e2)". If the row containing the cell is determined to exist, it returns e1, otherwise it returns e2. Thus, substituting the "presentv" function in the above query, the query can be expressed as:

$s$['wine', 2000]=presentv($s$['wine', 1999], $s$['wine', 1999], 0)

Another potentially useful variation of the "is present" predicate is the "presentnnv" (present & not null) function, for example "presentnnv(cell, e1, e2)". The "presentnnv" function checks if the cell is present and not null and is equivalent to:

case when is present <cell> and is not null <cell>
then <e1>
else <e2>
end

This function can be used to emulate the behavior of some multidimensional tools; if the cell existed and has non-null data, leave it alone, otherwise create it (if didn't exit) and assign a value. For example:

$s$['wine', 2000]=presentnnv($s$['wine', 2000], $s$['wine', 2000], 200)

In certain embodiments, the "is present" predicate and the presentv and presentnnv functions are available only inside the spreadsheet clause and outside usage will generate an error condition. Although the "is present" and "is null" predicates can be used for testing the existence and null state of each cell, it is generally cumbersome to use. To address this, an option on the spreadsheet clause called IGNORE NAV may be introduced which provides a spreadsheet like behavior for missing and null values. When this option is specified, null and missing value for numeric & date data default to zero ("0") and the string data defaults to an empty string. For example for the expression,

```
select p, r, t, sum(m) as s
from fact
group by p, r, t
partition by r dimension by p, t ignore NAV
(
    s['beer', 2000] = s['beer', 1998] + s['beer', 1999]
)
``` if s['beer', 1998] is missing or null, it will default to zero ("0") for arithmetic operations.

Update Options

In one embodiment, the updates in the spreadsheet clause default to the upsert semantic (i.e., if the cell pointed by the left side exists, then it is updated, otherwise a new row containing that cell is generated). In certain embodiments, this default can be changed to the update semantic by specifying the UPDATE or UPDATEIF options.

Using the UPDATE option, if the left hand side of the assignment does not exist, then a (run time) error is generated. Alternatively, using the UPDATEIF option, if the left hand side does not exist, then the assignment is ignored.

For example, in the query:

```
select p, r, t, sum(m) as s
from fact
group by p, r, t
partition by r dimension by p, t updateif
(
    s[p = 'wine', t=2000] =
        s[current(p), t=1999] + s[current(p), t=1998]
)
``` if a row with [p='wine', t=2000] does not exist, the assignment is ignored.

Rules for the Spreadsheet Clauses

This section provides further examples of how the SQL language is extended for implementing rules in the spreadsheet clause. In general, the columns in the spreadsheet clause (i.e. columns in PARTITION/DIMENSION BY) must form a key to the query. Users can assure that by placing the GROUP BY/DISTINCT in the query or by creating unique key constraints on the tables in the query. If these two compile time recognizable conditions are not satisfied, a uniqueness verification step will be performed during run time which will add overhead to the system, thus potentially affecting its performance.

In certain embodiments, the only columns that can be updated inside the spreadsheet clause are columns that are not in the PARTITION BY/DIMENSION BY list. The columns in the spreadsheet clause can be expressions provided that they are aliased in the SELECT clause of the query. For example, to express that sales in the third millennium will be an average of sales in first and second millennium, the following query may be used:

```
select r, ceil(t/1000) as millennium, sum(m) as s
from fact
group by ceil(t/1000)
partition by r dimension by millennium upsert
(
    s[millenium=3] = avg(s) (millennium between 1 and 2)
)
```

As illustrated, the spreadsheet clause can use aliases from the SELECT list of the query. Additionally, the spreadsheet clause is a part of a query block. Thus, it can be used everywhere a query can be used (i.e. in views, in-line views, subqueries, etc).

In general, the spreadsheet clause is evaluated after all clauses, except for the ORDER BY clause, of a query block have been evaluated, including window functions. The ORDER BY clause is executed last.

For example, in the query,

```
select p, r, t, s
from
(
    select p, r, t, sum(m) as s
    from fact
    group by p, r, t
    partition by r dimension by p, t upsert
    (
        s['wine increase 90–99', 2000] =
            reg_slope(s, t) ['wine', t between 1990 and 1999],
        s['wine', 2000] =
            s['wine', t=1999] * (1+s['wine increase 90–99', 2000])
    )
)
where p <>'wine increase 90–99'
``` the inner query contains the spreadsheet clause. This clause has a temporary variable s[p='wine increase 90–99'] which represents a change in wine production between 1990 and 1999. It may be calculated using the reg_slope aggregate function. The temporary variable that is generated is then used to calculate wine sales in year 2000: s[p='wine', t=2000]. However, in the outer query, the temporary variable is not needed and thus may be filtered out.

Order of Evaluation of Cells within Spreadsheet Clause

Similarly to spreadsheets, the order of evaluation or rules is typically determined using a dependency graph. A cell c1 which depends on other cell c2 will be evaluated after all rules for c2 has been computed.

For example, in the query:

```
select p, r, t, sum(m) as s, count(m) as c
from fact
group by p, r, t
partition by r dimension by p, t upsert
(
    s[r='west',y=2000] = s[r='west',y=1999] + s[r='west',y=1998],
    s[r='west',y=1999] = 50000,
    s[r='west',y=1998] = 40000
)
``` cell s[r='west', y=2000] depends on cells s[r='west', y=1999] and s[r='west', y=1998]. Thus, the latter two cells will be evaluated first.

In certain cases, a user can force the specified order of evaluation by providing the ORDERED keyword in the spreadsheet clause. For example in the query:

```
select p, r, t, sum(m) as s
from fact
group by p, r, t
partition by r dimension by p, t ordered upsert
(
    s[r='west',y=2000] = s[r='west',y=1999] + s[r='west',y=1998],
    s[r='west',y=1999] = 50000,
    s[r='west',y=1998] = 40000
)
``` the assignments are performed in the specified sequence. If ORDERED is not present, only one rule can assign to the same cell in the spreadsheet.

Cycles and Simultaneous Equations

Similarly to spreadsheets, the described computations may contain cycles. For example, the query:

```
select x, s
from (select 1 as x, 1024 as s from dual)
dimension by x update
(
    s[1] = s[1]/2
)
``` performs a recursive calculation, s[1]:=s[1]/2, which raises the termination question. In this example, the initial value for s=1024 has been provided by the inner select.

Cycles are not normally allowed in the spreadsheet clause and will typically be detected and result in an error. However, cycles are allowed in the spreadsheet clause if the explicit ITERATE subclause is specified. This clause can either specify a number of iterations to be performed or some convergence condition to be met.

For example, the ITERATE(4) clause:

```
select x, s
from (select 1 as x, 1024 as s from dual)
dimension by x update iterate (4)
(
    s[1] = s[1]/2
)
``` will iterate 4 times over the s[1]:=s[1]/2. Thus the query will return a single tuple (1, 64). In this example, the ITERATE clause accepts a positive numeric constant as a parameter.

Similarly to spreadsheets, using the pre-update state and the post update state of a cell, a condition can be specified as to when to terminate a recursion. For example, in one embodiment, a new UNTIL <condition> subclause is provided for allowing the termination of recursion. The <condition> can reference "s" pre- and post-update values of a cell and is evaluated after each iteration completes. Thus, a delta change of a cell can be determined and can serve as a convergence criteria. In certain embodiments, a new function, "previous(<cell>)", returns a value of <cell> as the start of each iteration. The UNTIL clause must be used with the ITERATE clause to guarantee that computation will terminate.

For example, in the query,

```
select x, s
from (select 1 as x, 1024 as s from dual)
dimension by x iterate (1000) until (previous(s[1])–s[1] < 1)
(
    s[1] = s[1]/2
)
``` the spreadsheet clause will execute 10 times. The parameter "s" will start with an initial value of 1024 and will iterate until the previous value of "s," minus its current value is less than one ("1") (i.e., in this example, ten times).

The described mechanism can be used for simultaneous equations. As usual, for the ITERATE clause, the order of evaluation of rules is given by their order in the spreadsheet clause. Thus for example, in the query:

```
select x, s
from (select 1 as x, 10 as s from dual
    union all
    select 2 as x, 20 as s from dual)
dimension by x update iterate (2)
(
    s[1] = s[2] + 1,
    s[2] = s[1] * 2
)
``` rules s[1]=s[2]+1 and s[2]=s[1]*2 reference each other cells.

In this example, the initial value for s[1]=10 and s[2]=20. The rule s[1]=s[2] +1 is first executed followed by s[2]=s[1]*2. After two iterations, s[1]=43 and s[2]= 86.

In many scenarios it is convenient to have the iteration number at hand for programming purposes. In one embodiment, a new system variable SYSITERATE is introduced which assumes integer values and stores the iteration number of the spreadsheet clause. The system variable SYSITERATE starts at value of zero ("0") and can be used only within the spreadsheet clause; outside usage resulting in an error condition. In certain embodiments, SYSITERATE can serve a "simple" array looping construct. For example, the query:

```
select p, r, t, sum(m) as s, count(m) as c
from fact
group by p, r, t
partition by r dimension by p, t upsert iterate(10)
(
```

```
    s[r='west',y=2000+SYSITERATE] =
    s[r='west',y=1990+SYSITERATE]
)
``` will copy sales in region 'west' from 1990–1999 to cells 2000–2009.

Materialized Views and Spreadsheet Clause

The spreadsheet clause, being part of a query block can be used in materialized views (MVs). In certain embodiments, a materialized view with a spreadsheet clause can only be refreshed with complete refresh. Different algorithms may be used for performing the incremental refreshes.

Rewrite with MVS Containing Spreadsheet Clause

Consider a materialized view M without the spreadsheet clause and a query Q with one. The query Q can be rewritten to access M with no restrictions using rewrite rules as described in:

U.S. patent application Ser. No. 09/221,647, entitled USING A MATERIALIZED VIEW TO PROCESS A RELATED QUERY CONTAINING A SEMIJOIN, filed by WITKOWSKI, on Dec. 28, 1998;

U.S. patent application Ser. No. 09/221,913, entitled USING A MATERIALIZED VIEW TO PROCESS A RELATED QUERY CONTAINING AN ANTI JOIN, filed by WITKOWSKI, on Dec. 28, 1998;

U.S. patent application Ser. No. 09/221,649, entitled USING A MATERIALIZED VIEW TO PROCESS A RELATED QUERY CONTAINING A ONE TO MANY LOSSLESS JOIN, filed by WITKOWSKI, on Dec. 28, 1998;

U.S. patent application Ser. No. 09/221,641, entitled REWRITING A QUERY IN TERMS OF A SUMMARY BASED ON FUNCTIONAL DEPENDENCIES AND JOIN BACKS, AND BASED ON JOIN DERIVABILITY, filed by BELLO et. al., on Dec. 28, 1998;

U.S. patent application Ser. No. 09/221,363, entitled REWRITING A QUERY IN TERMS OF A SUMMARY BASED ON ONE-TO-ONE AND ONE-TO-MANY LOSSLESSNESS OF JOINS, filed by BELLO et. al., on Dec. 28, 1998;

U.S. patent application Ser. No. 09/361,688, entitled REWRITING QUERIES TO ACCESS MATERIALIZED VIEWS THAT GROUP ALONG AN ORDERED DIMENSION, filed by WITKOWSKI et. al., on Jul. 27, 1999, the contents of which are hereby incorporated by reference in their entirety.

For example, given the MV
create materialized view mav enable query rewrite
as
select c, p, r, t, sum(m) as s, count(m) as c, count(*) as call
from fact
group by c, p, r, t;
and the query:

Q4  select p, r, t, sum(m) as s
    from fact
    group by p, r, t
    partition by r dimension by p, t -continued

```
(
    s['wine', 2000] = 0.2 * avg(s)[current(p), t between 1996 and 1999],
    s['beer', 2000] = 0.5 * avg(s)[current(p), t between 1995 and 1999]
)
``` it can be rewritten as:

```
select p, r, t, sum(m) as s
from mav
group by p, r, t
partition by r dimension by p, t
(
    s['wine', 2000] = 0.2 * avg(s)[current(p), t between 1996 and 1999],
    s['beer', 2000] = 0.5 * avg(s)[current(p), t between 1995 and 1999]
)
```

Observe that in doing so, the materialized view MAV contains more columns in the GROUP BY than the query Q4. Thus it has to be rolled up before applying the spreadsheet clause. Now consider a materialized view M containing the spreadsheet clause. Rewrites using M will be limited as the spreadsheet clause introduces non-trivial data containment problems. The restrictions are as follows.

(1) Q must have the spreadsheet clause and the clauses of M and Q must match exactly.

(2) If M' and Q' are M and Q without the spreadsheet clauses, M' must produce the same set of rows as Q'.

This implies that some of the existing rewrite rules (for example, see above cited patents) can be applied (in particular lossless join rules and column equivalence rules). However, many existing rules, like the rollup rule cannot be used as in this case, M' can contain more rows than Q'.

For example consider the MV:

```
create materialized view mav2 enable query rewrite
as
select p, r, t, sum(m) as s, count(m) as c, count(*) as call
from fact
group by p, r, t
partition by r dimension by p, t
(
    s['wine', 2000]
        0.2 * avg(s)['wine', t between 1996 and 1999],
    s['beer', 2000] =
        0.5 * avg(s)['beer', t between 1995 and 1999]
)
```

Here, the MV can be used for rewriting the query:

```
select p, r, t, sum(m) as s, count(m) as c, count(*) as call
from fact, product
where product.p = fact.p
group by p, r, t
partition by r dimension by p, t
(
    s['wine', 2000] = 0.2 * avg(s)['wine', t between 1996 and 1999],
    s['beer', 2000] = 0.5 * avg(s)['beer', t between 1995 and 1999]
)
``` if the join between fact><product is lossless. However, the same mav2 cannot be used for a rewrite of a very similar query which contains restrictions in the WHERE clause. For example, in the query:

```
Q5  select p, r, t, sum(m) as s, count(m) as c, count(*) as call
    from fact, product
    where fact.p <> 'wine'
    group by p, r, t
    partition by r dimension by p, t
    (
        s['wine', 2000] =
            0.2 * avg(s)['wine', t between 1996 and 1999],
        s['beer', 2000] =
            0.5 * avg(s)['beer', t between 1995 and 1999]
    )
```

Q5 restricts the fact table to rows where p< >'wine'. Mav2, on the other hand, contains those rows and thus could use them for calculations in the spreadsheet clause. Deciding on what to filter from mav2 in this case can be difficult and thus materialized views with spreadsheet clauses may be less useful for rewrite. Therefore, it is recommended that users should consider using materialized query blocks without the clause.

Recommended Usage of MVS with Spreadsheet Clause

In certain spreadsheet applications, it is conceivable that the select query of the spreadsheet clause will be an aggregation over a large set (i.e., millions of rows). The result, however, will be a relatively small set (up to 10s of thousands of rows). This result will be partitioned into smaller sets (of hundreds of rows), and those rows will be a subject to the spreadsheet clause where up to 80 percent of them will be changed. Thus, it follows that described system may at times have thousands of partitions with hundreds of update rules per partition.

For example, the query:

```
Q6  select p, r, t, sum(m) as s
    from fact
    group by p, r, t
    partition by r dimension by p, t
    (
        s[p='wine', t=2000] = 0.2 * avg(s)[current(p), t between 1996 and 1999],
        s[p='beer', t=2000] = 0.5 * avg(s)[current(p), t between 1995 and 1999],
        s[p='coke', t=2000] = 0.6 * avg(s)[current(p), t between 1994 and 1999],
        .................
        <hundreds of other update rules>
    )
``` will likely generate thousands of partitions with potentially hundreds of update rules per partition. Materialized views can be effectively used in this scenario if a self-recomputable spreadsheet is needed. In one embodiment, two separate MVs: one for the SELECT . . . GROUP BY . . . query and one for the spreadsheet can be used. For example, the above query can be expressed as a recursive materialized view by:

create materialized view mav
refresh fast
enable query rewrite
as
select p, r, t, sum(m) as s, count(m) as c, count(*) as call
from fact
group by p, r, t
and by,

```
create materialized view spreadsheet_my
enable query rewrite
as
select p, r, t, s
from mav
partition by r dimension by p, t
(
    s[p='wine', t=2000]=
        0.2 * avg(s)[current(p), t between 1996 and 1999],
    s[p='beer', t=2000]=
        0.5 * avg(s)[current(p), t between 1995 and 1999],
    s[p='coke', t=20001 =
        0.6 * avg(s)[current(p), t between 1994 and 1999],
    ..................
    <hundreds of other update rules>
)
```

Here, materialized view MAV can be incrementally maintained. Materialized view SPREADSHEET_MV is much smaller (as it is build on top of MAV) and is maintained by a complete refresh. Thus, a Materialized View enables a user to store and re-compute models, including the simultaneous equation models, within a RDBMS, such as Oracle RDBMS™. Also, as mentioned above, the rewrite capability of MVs may be somewhat limited and thus should typically be in scenarios where refresh is more important than rewrite.

Optimization of Queries with the Spreadsheet Clause

There are several optimizations that may be applied to queries with the spreadsheet clause. One optimization that may be applied is avoiding unnecessary computation in the spreadsheet clause. For example, when the clause is included in a view, and the outer query selects data that are outside of any updates done by the spreadsheet clause. As an example, consider the following query:

```
select p, r, t, s
from
(
    select p, r, t, s
    from fact
    partition by r dimension by p, t
    (
        s[p='wine', t=2000] = 0.2 * avg(s)[current(p), t between 1996 and 1999],
        s[p='beer', t=2000] = 0.5 * avg(s)[current(p), t between 1995 and 1999]
    )
)
where p = 'coke';
```

In this example, the query does not select data that is updated by the spreadsheet clause and, therefore, its execution can be pruned out. This type of optimization can generally be determined at compile time. In addition, if the outer query selects data where [p='beer'], then only portion of the spreadsheet clause would need to be executed.

In one embodiment, an optimizer is used to detect and prune-out unnecessary computation done by the spreadsheet clause. For example, an optimizer can be used at compile time to identify and prune unnecessary computations that may exist within a spreadsheet clause.

Example Usage of the Speadsheet Clause

The following are examples of how a spreadsheet clause may be used within a RDBMS to achieve spreadsheet-like operations in SQL.

Case 1. The objective is to show the sales for New York and New Jersey and the differences between the two, for each product. The differences are to be recorded in a new row with city='Diff'.

```
select product, city, sum(sales) as s
from f
where city in ('NYC', 'New Jersey')
group by product, city
partition by product dimension by city upsert
(
    s['Diff'] = s['NYC']- s['New Jersey']
)
```

Case 2. The objective is if sales for each product in each city grew (or declined) at the same monthly rate from November 1999 to December 1999 as they did from October 1999 to November 1999, what would the fourth quarter look like for the company and each city?

```
select sum(s),city
from
(
    select product, city, month , sum(sales) as s
    from f
    where year=1999 and month in ('oct','nov')
    group by product, month, city
    partition by product,city dimension by month  UPSERT
    (
        s['dec']=(s['nov']/s['oct'])*s['nov']
```

```
    )
  )
  group by grouping set(( ),(city));
```

Case 3. The objective is to calculate 30% of an individuals net income as interest (net=pay minus tax minus interest). Interest is tax deductible from gross, and taxes are at 38% of salary and 28% capital gains. Want to determine how much the individual should borrow? This is an example of a simultaneous equation (net depends on interest which depends on net), thus the ITERATE clause is included.

```
select sum(balance) as s,account
from ledger
where holder='gregory' and account in('salary', 'cap_gain')
dim (account) iterate(1000) update
(
    s['net'] = s['salary']-s['interest'] -s['tax']
    s['tax'] = (s['salary']-s['interest'])*0.38 + s['cap gain']*0.28
    s['interest']= s['net']*0.30
)
```

Case 4. Sales for Dec are expected to be the average of sales for the past 6 months for each state/product. The objective is to show the sales for last 6 months and to forecast for the sales for December.

```
select sum(sales) as s,state,month
from f
where year=1999 and month between 5 and 11
group by state, month
partition by (state) dim (month) upsert
(
        s[12] = ave(s) [month between 5 AND 11]
)
```

Case 5. Sales of wine in 2000 will increase in comparison to 1999 as they did on the break of last century i.e., between 1899 and 1900. Sales of beer in 2000 will increase in comparison to 1999 as they did between the happy 60-ies war period, i.e., between 1960 and 1969. The objective is to calculate the increase using the regression aggregate function, reg_slope.

```
select p, r, t, sum(m) as s
from fact
group by p, r, t
partition by r dimension by p, t upsert
(
    s['wine', 2000] = s['wine', 1999]
        * (1+reg_slope(s, t) ['wine', t between 1899 and 1900])
    s[beer', 2000] = s['beer', 1999]
        * (1+reg_slope(s, t) ['beer', t between 1960 and 1969])
)
```

Spreadsheet Templates

In certain embodiments, the spreadsheet clause described in this document is a part of a query block that requires an extension to the basic SQL structure. In one embodiment, an extension to the basic SQL structure may be avoided by introducing the concept of a spreadsheet template. The end of the section compares advantages of two approaches.

In one embodiment, the spreadsheet clause is declared as a computational template by extending the <with clause> as defined in ISO/IEC 9075-2:1999 subclause 7.12, <query expression>, which is then used in the main query as a function applied to a table or a query. The spreadsheet template can be stored as an object and later applied to the result of a query and this is the stored version of spreadsheet clause. In certain embodiments, the spreadsheet template has extremely close syntax to that of the spreadsheet clause, so all of the concepts from the spreadsheet clause apply here as well.

In-Line Spreadsheet Template

In certain embodiments, the WITH clause is extended to define the spreadsheet template. The template consists of <template name>, <input columns> and the definition of the spreadsheet clause as described previously in this document—(see "SPREADSHEET CLAUSE"). The following is an example of the format of the template in accordance with certain embodiments of the invention:

```
Q22   WITH SPREADSHEET TEMPLATE <template name>
            IN (<input columns>)
          PARTITION BY <cols> DIMENSION BY <cols>
                [ORDERED] [UPSERT | UPDATE | UPDATEIF]
                [IGNORE NAV]
                [ITERATE (n) [UNTIL <condition>]]
          (
            <update rule>, <update rule>, . . . , <update rule>
          )
```

In this example, the WITH clause defines the drink_projection template.

```
with spreadsheet template drink_projection
    in (p varchar2, r varchar2, t number, s number)
  partition by r dimension by p, t
  (
      s[p='wine', t=2000] = s[p='wine',t=1999],
      s[p='beer', t=2000] = s[p='beer',t=1998] + s[p='beer',t=1999]
  )
```

This template can then be applied to a query in a manner that is similar to that described for the parameterized view to a query. For example, the entire query with the above template could be:

```
with spreadsheet template drink_projection
        in (p varchar2, r varchar2, t number, s number)
  partition by r dimension by p, t
  (
      s[p='wine',t=2000] = s[p=wine,t=1999]
      s[p='beer',t=2000] = s[p='beer',t=1998] + s[p='beer',t=1999]
  )
  select p, r, t, s
  from drink_projection
      (
          select p, r, t, sum(s) as s
          from fact
          group by p, r, t
      )
```

Stored Template

In certain embodiments, the spreadsheet template is stored as a new database object. In one embodiment, three new DDL statements: CREATE SPREADSHEET TEMPLATE, ALTER SPREADSHEET TEMPLATE and DROP SPREADSHEET TEMPLATE are used.

CREATE SPREADSHEET TEMPLATE is analogous to defining an in-line form of the template (see Q22 above). For example:

```
Q23   CREATE SPREADSHEET TEMPLATE <template name>
            IN (<input columns>)
      PARTITION BY <cols> DIMIMENSION BY <cols>
            [ORDERED] [UPSERT | UPDATE | UPDATEIF]
            [IGNORE NAV]
            [ITERATE (n) [UNTIL <condition>]]
      (
         <update rule>, <update rule>,..., <update rule>
      )
```

Once the template has been defined, it can be used in queries. For example, it can be used in the following query:

```
select p, r, t, s
from drink_projection
    (
       select p, r, t, sum(s) as s
       from fact
       group by p, r, t
    )
```

ALTER TEMPLATE statement allows <update rules> to be added or dropped from the template. Its format is:

```
ALTER SPREADSHEET TEMPLATE <template name>
[ADD | DROP]
(
      <update rule>, <update rule>,..., <update rule>
)
ALTER SPREADSHEET TEMPLATE drink_projection
ADD
(
      s[p='coke',t=2000] = s[p='coke',t=1998] + s[p='coke',t=1999]
)
```

For example, to add an update rule to the drink_projection template to project sales of coke in 2000, the following update query may be used:

```
ALTER SPREADSHEET TEMPLATE drink_projection
ADD
(
   s[p='coke',t=2000] = s[p='coke',t=1998] + s[p='coke',t=1999]
)
```

Similarly, <update rules> can be used to drop a rule from the drink_projection template. In certain embodiments, if there are duplicates of an <update rule>, the duplicates will also be removed.

Multi-Measure Aggregates

In certain embodiments, aggregates over multiple measures are required to specify the same ranges over each measure. For example, the query:

Q25 $s['beer', 2000]=\text{sum}(s*w)['beer', t \text{ between } 1998 \text{ and } 1999]$ imposes the requirement that both measures s and w vary over the same range: ['beer', t between 1998 and 1999]. The aggregate is specified over measures only with the range definition factored out. Alternatively, each measure may be specified with its own range, as for example:

Q26 $s['beer', 2000]=\text{sum}(s['beer', t \text{ between } 1998 \text{ and } 1999] * w['beer', t \text{ between } 1998 \text{ and } 1999])$ In certain embodiments, a verification process is executed at the compile time to ensure that the ranges are identical.

However, a syntax that allows each measure to come with its own range would provide for the specifying of different ranges for every measure, as in the following example:

Q27 $\text{sum}(s[d1 \text{ between } 'C' \text{ and } 'D', d2 \text{ between } 1 \text{ and } 2]*$ $p[d1 \text{ between } 'K' \text{ and } 'L', d2 \text{ between } 11 \text{ and } 12])$ In this case, it may be desirable to ensure that each range has the same cardinality. However determining whether each range has the same cardinality, even at run time, may be problematic. For example, assume the data consists of the following:

$(d1, d2)$ data: $('C', 1), ('C', 1.3), ('C', 1.6), ('C', 2)$ and $('K', 11) ('K', 12), ('L'11) ('L', 12)$.

The cardinality of the range [d1 between 'C' and 'D', d2 between 1 and 2] is 4. Likewise, the cardinality of [d1 between 'K' and 'L', d2 between 11 and 12] is 4. However, the shape of the ranges is different. For example, the first range spans only one value in d1 ('C') and its shape is a line, while the second range spans range two values ('K' and 'L') and its shape is a square. It is unlikely that a user would want this situation to occur.

For example, consider the execution of the following expression SUM(B1:B15*C11:C25) in a spreadsheet program. The execution of the expression first produces an internal array of multiples, which is then summed-up into a scalar value. Applying an equivalent expression to the syntax of Q27, the function SUM would be written as follows:

Q28 $\text{sum}(s[d1='B', d2 \text{ between } 1 \text{ and } 15]* s[d1='C', d2 \text{ between } 11 \text{ and } 25])$ However, now consider the scenario in which the dimensions (d1, d2) can have the following values:

$('B', 1), ('B', 5), ('B', 6.6) ('C', 11), ('C', 12.6), ('C', 24)$.

In this case, the shape of both ranges are the same (they are lines) and the result would be as follows:

$s['B', 1]*s['C', 11]+s['B', 5]*s['C', 12.6]+s['B', 6.6] *s['C', 24]$.

In one embodiment, to resolve the potential cell matching problem, the system requires that not only cardinality of the ranges are the same, but also that the shapes are the same as well. To achieve this goal, in certain embodiments, for each dimension d a check is made to determine if it qualifies the same number of rows in every range. For example, for the above data, d1 in Q28 qualifies one value in both ranges (i.e., value 'B' in first and 'C' in second range), and d2 qualifies three values in the first range (1, 5, 6.6) and three values in the second range (11, 12.6, 24). Thus, the shapes are the same. In certain embodiments, the verification process that ensures that the shapes match is performed at run time.

In other embodiments, potential cell matching problems are resolved by explicitly enumerating cells either using the IN construct or the INCREMENT operator. Each range can then be verified at compile time as the set of cell can be easily matched for multi-measure aggregates.

For example, for the following query:

Q29 sum(s[d1='B', d2 in (1, 2, . . . , 14, 15)]* s[d='C', d2 in (11, 12, . . 24, 25)])

the result is s['B', 1]*s['C', 11], as other points like ('B', 5), ('B', 6.6) do not qualify. To avoid ambiguity, the system steps through the IN list in order of its elements (i.e., d2=1, d2=2, . . . d2=15).

Additionally, Q29 may be rewritten using the INCREMENT operator as follows:

Q30 sum(s[d1='B', d2 between 1 and 15 increment 1]* s[d1='C', d2 between 11 and 25 increment 1])

In this example, the syntax of Q30 works well for numeric and date dimensions where the INCREMENT operator is applicable. However, string typed dimensions would typically need to be enumerated explicitly.

The syntax of Q29 and Q30 can be used to address array computations in which the left-hand and the right-hand sides define identically shaped arrays. For example, the following query could be used:

Q31 s[d1='A', d2 between 1 and 10 increment 1]= TREND(s[d1='B', d2 between 11 and 20 increment 1], s[d1='C', d2 between 31 and 40 increment 1])

In this example, the TREND function takes as an input two arrays of cells and outputs identically shaped array of cells. The input arrays are [d1='B', d2 between 11 and 20 increment 1] and [d1='C', d2 between 31 and 40 increment 1]. Both are vectors containing ten elements. The output array is [d1='A', d2 between 1 and 10 increment 1]. It also is a vector containing 10 elements. This syntax can be also used for a range of arguments for a binary aggregate (i.e., one that takes two arguments), such as linear regression slopes and intercepts. For example, suppose we have measures X and Y dimensioned by year (i.e., a table (year, x, y)). Then the slope of X & Y can be determined even if (x,y) doesn't come from the same row.

For example:

reg_slope(x[year IN (1990, 1991, 1992)], y[year IN (1991, 1992, 1993)])

The above syntax using INCREMENT is compile time verifiable and simple to understand. However, it suffers from not being able to specify the existing data. For example, observe that 'd2 between 11 and 20' includes all values of d2 in that interval. However, 'd2 between 11 and 20 increment 1' allows for 10 values only: 11, 12, . . . , 30.

Thus as previously shown, the concepts illustrated in Q25, which guarantees that ranges are the same, will cover most of the cases. The syntax of Q29 and Q30 covers the case when the ranges can be different but their shape is the same, and the ranges can be discovered at compile time as all range values are effectively enumerated using either IN or INCREMENT operator. Finally, for the syntax of Q27, the ranges can be different but their shape must be the same, and ranges will be determined at run time.

Looping Constructs

Several examples have been provided that illustrate the use of looping constructs. A number of examples illustrate declarative looping constructs. Others illustrate programmatic looping constructs. In general, the looping constructs work well for cells with numeric indexing. However, they typically do not work as well for other data types.

For example, given that t is of numeric type, the construct:

s[p='beer', t between 2000 and 2005 increment 1]= s['beer', t=current(t)-2]+s['beer', t=current(t)-1]

generates assignments for 'beer'in year 2000, 2001, 2002, 2003, 2004 and 2005 to be a sum of the previous two years. The construct would not work if "t" is a string type of the form 'year2000', 'year2001', 'year2002', etc., as "t" could not be converted to a numeric value and thus used to perform the increments.

In one embodiment, to address this problem, a general programmatic looping construct is provided. For example, the following programmatic construct may be used:

for i=2000, i<=2005, i++s[p='beer', t='year'||i]=s ['beer', t=current(t)=2] +s['beer', t=current(t)=1]

Data Driven Computation—Relaxing Cell Addressing

In general, cells are specified using boolean conditions on individual dimensions. The conditions reference single dimension and constants.

For example, in the query:

Q32 select p, r, t, s
from f
where p in ('wine', 'beer', 'coke')
partition by r dimension by p, t
(
  s[p='wine', t=2000] = 0.2 * avg(s)['wine', t between 1996 and 1999],
  s[p='beer', t=2000] = 0.5 * avg(s)['beer', t between 1995 and 1999],
  s[p='coke', t=2000] = 0.6 * avg(s)['coke', t between 1994 and 1999],
)

the production of wine, beer and coke is projected for the year 2000. For each product, there are three parameters: weight and start and end time for the prediction. For example, for wine, the weight is 0.2, and the start and end times are 1996 and 1999 respectively. Since the parameters are per product, it may be desirable to put them in a look up table which associates a product with its prediction parameters. In this case the lookup table would be lookup p, weight, syear, eyear):

| p | weight | syear | eyear |
|---|---|---|---|
| wine | 0.2 | 1996 | 1999 |
| beer | 0.5 | 1995 | 1999 |
| coke | 0.6 | 1994 | 1999 |

The challenge here is how to use the spreadsheet clause to address the cells by data from the lookup table rather than constants like in Q32. In one embodiment, the restrictions could be relaxed on the Boolean conditions for addressing dimensions. Currently such condition can reference a single dimension d and constants. In addition, certain measures may be allowed (i.e., columns not in the PARTITION BY/DIMENSION BY list).

For example, for the following expression:

s['wine', 2000]=s['wine', t=syear['wine', 1999]]

cell temp=syear['wine', 1999] may be retrieved first, and then used to qualify t in s['wine', t=temp]. Thus the above query (Q32) could be rewritten as:

```
Q33   select p, r, t, s
      from f, lookup
      where f.p in ('wine', 'beer', 'coke')
         and f.p = lookup.p
      partition by r dimension by p, t
      (
         s[*, t=2000]avg(s*weight)[., t between syear[.,.] and eyear[.,.]]
      )
```

In this example, product p determines the weight, syear, and eyear. Thus, for every pair (p, t), these parameters are determinable as the spreadsheet clause guarantees that the above query is unambiguous.

In certain embodiments, the ITERATE clause is extended to iterate over a table (or query). Here, the idea is to take every row from the lookup table (p, weight, syear, eyear) and to base the results on the construct of the spreadsheet clause as illustrated in the following query:

```
Q34   select p, r, t, s
      from f, lookup
      where f.p in ('wine', 'beer', 'coke')
         and f.p = lookup.p
      partition by r dimension by p, t
      iterate over
         (select p, weight, syear, eyear from lookup l order by p)
      (
         s[1.p, t=2000] =
            avg(s*1.weight)[1.p , t between 1.syear and 1.eyear]
      )
```

In this example, the spreadsheet clause executes as many times as there are rows in the lookup table. Each row provides parameters for the next iteration. Of note, the ORDER BY clause has been inserted into the ITERATE OVER subquery as the execution of the spreadsheet clause will depend on the order of rows from the lookup table. A unique ordering could be required for deterministic results.

A variation of the above example is to cause looping over the lookup table per rule, as in the following example:

```
Q35   select p, r, t, s
      from f, lookup
      where f.p in ('wine', 'beer', 'coke')
         and f.p = lookup.p
      partition by r dimension by p, t
      (
         for 1 in (select p,weight,syear,eyear from lookup order by p)
            s[1.p, t=2000] =
               avg(s*1.weight)[1.p , t between 1.syear and 1.eyear]
      )
```

Update|Updateif|Upsert Options on Individual Rules

The UPDATE, UPDATEIF, and UPSERT options are provided on the spreadsheet clause level. In addition, in certain embodiments, the UPDATE, UPDATEIF, and UPSERT options are provided on the individual rule level. For example, consider the following query:

```
      select p, r, t, sum(m) as s
      from fact
      group by p, r, t
```

```
      partition by r dimension by p, t
      (
         update: s['wine', 2000] = s['wine', 1998] + s['wine', 1999],
         updateif: s['beer', 2000] = s['beer', 1998] + s['beer', 1999]
      )
```

More General Indexing of Cells

In certain embodiments, a more general indexing method is provided for indexing a cell or range of cells that are identified by a boolean condition on all dimensions. For example, in the expression:

$s[\text{where } x^2+y^2=10]=20$ the condition $x^2+y^2=10$ designates points on a circle within a radius 10. The assignment would then assign a value of 20 to the cells on the radius.

In addition, another example is in the creation of an identity matrix for 2 dimensions (x, y), which can be expressed as follows:

$m[\text{where } x=y]=1, m[\text{where } x<>y]=0$

In this example, the order of evaluation is not specified, thus it is possible to write rules that are non-deterministic, as for example in:

$m[\text{where } x=y]=2*m[x=\text{current}(x)+1, y=\text{current}(y)+1]$

This example produces different results that are dependent on the order in which the cells are evaluated. In certain embodiments, to help users to control this non-determinism, an ORDER BY capability is provided to allow the ordering of selected rows. For example, the following syntax may be used to control the ordering of selected rows:

$m[\text{where } x=y \text{ order by } x]=2*m[x=\text{current}(x)+1, y=\text{current}(y)+1]$ Using general subscripts can make it difficult to sort the rules into an order based on their dependencies. As a consequence, if a user specifies a general subscript, the user must specify an ORDERED set of rules as unordered rules can typically only be used within the special subscripts. In one embodiment, the following is an ORDERED set of rules that may be specified by a user:

1. there are two kinds of subscripts: those beginning with WHERE ("general subscripts") and those that do not ("special subscripts");
2. special subscripts are equivalent to general subscripts by combining the subscripts with AND;
3. the left hand side of a rule specifies a set of cells that the rule will be applied to. The set of cells is effectively determined before executing the rule on any cell. (This does not prevent optimizations that recognize when it is legal to execute a rule as soon as a qualified cell is detected);
4. an operator is available on the right hand side of a rule that returns the current value of a dimension;
5. a cell reference on the right hand side which is within an argument to an aggregate specifies a set of cells that the aggregate is applied to;
6. any cell reference on the right hand side outside an aggregate must reference a single cell, else an exception is raised;

7. general subscripts on the left hand side also provide an ORDER BY clause for within-rule ordering, so that you can specify the order of evaluation of a rule that selects more than one cell;
8. general subscripts can only be used on the left hand side if the rules are ORDERED.

Window Functions and Aggregates with Order by

In one embodiment, the SQL is extended to provide a syntax for performing window functions or aggregates using ORDER BY like percentile_cont, in the spreadsheet clause. For example, the following syntax:

s['beer', 2000]=percent cont(0.5) within group (order by s) ['beer', t between 1998 and 1999]

Additionally, a possible syntax for window function, for example moving sum over one month, is as follows:

s['beer', t between 1998 and 1999]= sum(s) over (order by t range between '1' month proceeding) ['beer', t between 1998 and 1999]

and an example of rank is:

r['beer', t between 1998 and 1999]= rank( ) over (order by s) ['beer', t between 1998 and 1999]

Hardware Example

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for performing spreadsheet-like operations in a Structured Query Language (SQL). According to one embodiment of the invention, spreadsheet-like operations in a Structured Query Language (SQL) are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for performing spreadsheet-like operations in a Structured Query Language (SQL) as described herein.

The received code may be executed by processor 504 as it is received, and/or stored in storage device 510, or other non-volatile storage for later execution. In this manner, computer system 500 may obtain application code in the form of a carrier wave.

Alternatives, Extensions

A method and system for extending a Structured Query Language (SQL) for performing spreadsheet-like operations in a relational database system is described herein. In one embodiment, the extended SQL includes a spreadsheet clause that operates on the output of a query block. In certain embodiments, the operation of a spreadsheet clause does not prevent any optimization of the query block like rewrite with materialized views, index selection, or join order. In addition, the spreadsheet clause may provide for optimizations of queries and may avoid the re-computation of unneeded parts of the clause.

For example, given an inner query with the spreadsheet clause and an outer query with the restriction that it can be pushed inside the inner query, the spreadsheet clause can partition the data using PARTITION BY clause and execution of the clause may be performed in parallel across the partitions (i.e. each partition can be mapped in to a single slave and the computation within partition will not need information from other slaves). Alternatively, if the spreadsheet clause does not have a PARTITION BY clause, (i.e. it has only one partition), it will not be parallelized. However, this does not prevent the query feeding the rows to the clause from executing in parallel.

In describing certain embodiments of the invention, several drawing figures have been used for explanation purposes. However, the invention is not limited to any particular context as shown in drawing figures, as the scope of the invention includes other contexts and applications in which the mechanisms and processes described herein is available to other mechanisms, methods, programs, and processes. Thus, the specification and drawings are, accordingly, to be regarded in an illustrative rather than a restrictive sense. For example, although examples have been described for performing spread-sheet-like calculations in SQL, embodiments of the invention are limited to any particular database and/or query language. For example, in certain embodiments, the described features may be implemented for performing spread-sheet-like calculations in other languages, such as XML. Thus, the invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A computer-implemented method for processing database query operations, comprising:
   a database server receiving a database query including a first array reference symbolically referencing an array having one or more indexes;
   wherein the first array reference addresses, as a cell of the array, a certain row and a certain column of a relational structure;
   wherein each index of said one or more indexes corresponds to another column different than said certain column;
   wherein a first index of said one or more indexes corresponds to a first column;
   wherein the first array reference specifies a first index expression for the first index;
   wherein the first index expression of the first array reference corresponds to a first value in said first column;
   wherein the database query specifies an operation based on the first array reference; and
   in response to receiving said database query, the database server executing the database query by performing steps including performing said operation specified in said database query.

2. The method of claim 1, wherein:
   the one or more indexes include a second index;
   wherein the first array reference includes a second index expression for the second index.

3. A computer-readable medium carrying one or more sequences of instructions which, when executed by one or more processors, causes the one or more processors to perform the method recited in claim 2.

4. The method of claim 1, wherein the first index expression is a Boolean expression.

5. A computer-readable medium carrying one or more sequences of instructions which, when executed by one or more processors, causes the one or more processors to perform the method recited in claim 3.

6. The method of claim 1, wherein the first index expression identifies a range of values.

7. A computer-readable medium carrying one or more sequences of instructions which, when executed by one or more processors, causes the one or more processors to perform the method recited in claim 4.

8. The method of claim 1, wherein the first index expression corresponds to multiple values in the first colunm.

9. The method of claim 8, wherein:
   each value of said multiple values is stored in a respective row of said relational structure; and
   performing said operation specified in said database query includes performing, for said each value, said operation.

10. A computer-readable medium carrying one or more sequences of instructions which, when executed by one or more processors, causes the one or more processors to perform the method recited in claim 9.

11. A computer-readable medium carrying one or more sequences of instructions which, when executed by one or more processors, causes the one or more processors to perform the method recited in claim 8.

12. The method of claim 1, wherein the first index expression for the first array reference includes a looping construct that specifies a range of values.

13. A computer-readable medium carrying one or more sequences of instructions which, when executed by one or more processors, causes the one or more processors to perform the method recited in claim 12.

14. The method of claim 1, wherein:
the database query includes a second array reference to the array; and
wherein the second array reference includes a first index expression for the first index.

15. The method of claim 14, wherein the first index expression of the second array reference addresses an index value in a way that is relative to the first index expression of the first array reference.

16. A computer-readable medium carrying one or more sequences of instructions which, when executed by one or more processors, causes the one or more processors to perform the method recited in claim 15.

17. A computer-readable medium carrying one or more sequences of instructions which, when executed by one or more processors, causes the one or more processors to perform the method recited in claim 14.

18. The method of claim 1, wherein the operation is an update operation to the certain column of said certain row.

19. A computer-readable medium carrying one or more sequences of instructions which, when executed by one or more processors, causes the one or more processors to perform the method recited in claim 18.

20. The method of claim 1, wherein the operation is an insert operation of said certain row.

21. A computer-readable medium carrying one or more sequences of instructions which, when executed by one or more processors, causes the one or more processors to perform the method recited in claim 20.

22. The method of claim 1, wherein:
the database query specifies an operation based on the first array reference by specifying an assignment statement;
the database query includes a second array reference to the array;
the assignment statement includes an assignment expression that defines a value to assign to the cell represented by the first array reference; and
the assignment expression includes the second array reference.

23. The method of claim 22, wherein the assignment expression is on the right side of an assignment operator and the first array reference is on the left side of the assignment operator.

24. A computer-readable medium carrying one or more sequences of instructions which, when executed by one or more processors, causes the one or more processors to perform the method recited in claim 23.

25. The method of claim 22, wherein:
the first index expression corresponds to multiple values in the first column;
each value of said multiple values is stored in a respective row of said relational structure; and
performing said operation specified in said database query includes performing, for said each value of said multiple values, an assignment operation to the first column of the respective row of said each value.

26. A computer-readable medium carrying one or more sequences of instructions which, when executed by one or more processors, causes the one or more processors to perform the method recited in claim 25.

27. The method of claim 22, wherein the first index expression of the second array reference addresses an index value in a way that is relative to the first index expression of the first array reference.

28. The method of claim 27, wherein the first index expression for the first array reference includes a looping construct that corresponding to a range of values in the first column.

29. A computer-readable medium carrying one or more sequences of instructions which, when executed by one or more processors, causes the one or more processors to perform the method recited in claim 28.

30. A computer-readable medium carrying one or more sequences of instructions which, when executed by one or more processors, causes the one or more processors to perform the method recited in claim 27.

31. A computer-readable medium carrying one or more sequences of instructions which, when executed by one or more processors, causes the one or more processors to perform the method recited in claim 22.

32. The method of claim 1, wherein said database query correlates the first column of the relational structure to said first index.

33. A computer-readable medium carrying one or more sequences of instructions which, when executed by one or more processors, causes the one or more processors to perform the method recited in claim 32.

34. The method of claim 1, wherein said database query correlates the certain column of the relational structure to the measure of the array.

35. A computer-readable medium carrying one or more sequences of instructions which, when executed by one or more processors, causes the one or more processors to perform the method recited in claim 34.

36. A computer-readable medium carrying one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

PATENT NO. : 6,985,895 B2
DATED : January 10, 2006
INVENTOR(S) : Andrew Witkowski et al.

It is certified that error appears in the above-identified patent and that said Letters Patent is hereby corrected as shown below:

Column 32,
Line 57, "colunm" should read -- column --;

Column 34,
Line 22, "corresponding" should read -- corresponds --.

Signed and Sealed this

Twenty-fifth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,985,895 B2
APPLICATION NO. : 09/886839
DATED : January 10, 2006
INVENTOR(S) : Witkowski et al.

It is certified that error appears in the above-identified patent and that said Letters Patent is hereby corrected as shown below:

In column 34, line 16, delete "wherein the" and insert --wherein a--.

Signed and Sealed this

First Day of August, 2006

JON W. DUDAS
*Director of the United States Patent and Trademark Office*